Aug. 27, 1940.   A. R. STONE   2,212,904
POWER CLUTCH AND BRAKE ASSEMBLAGE
Original Filed Sept. 17, 1934   3 Sheets-Sheet 1
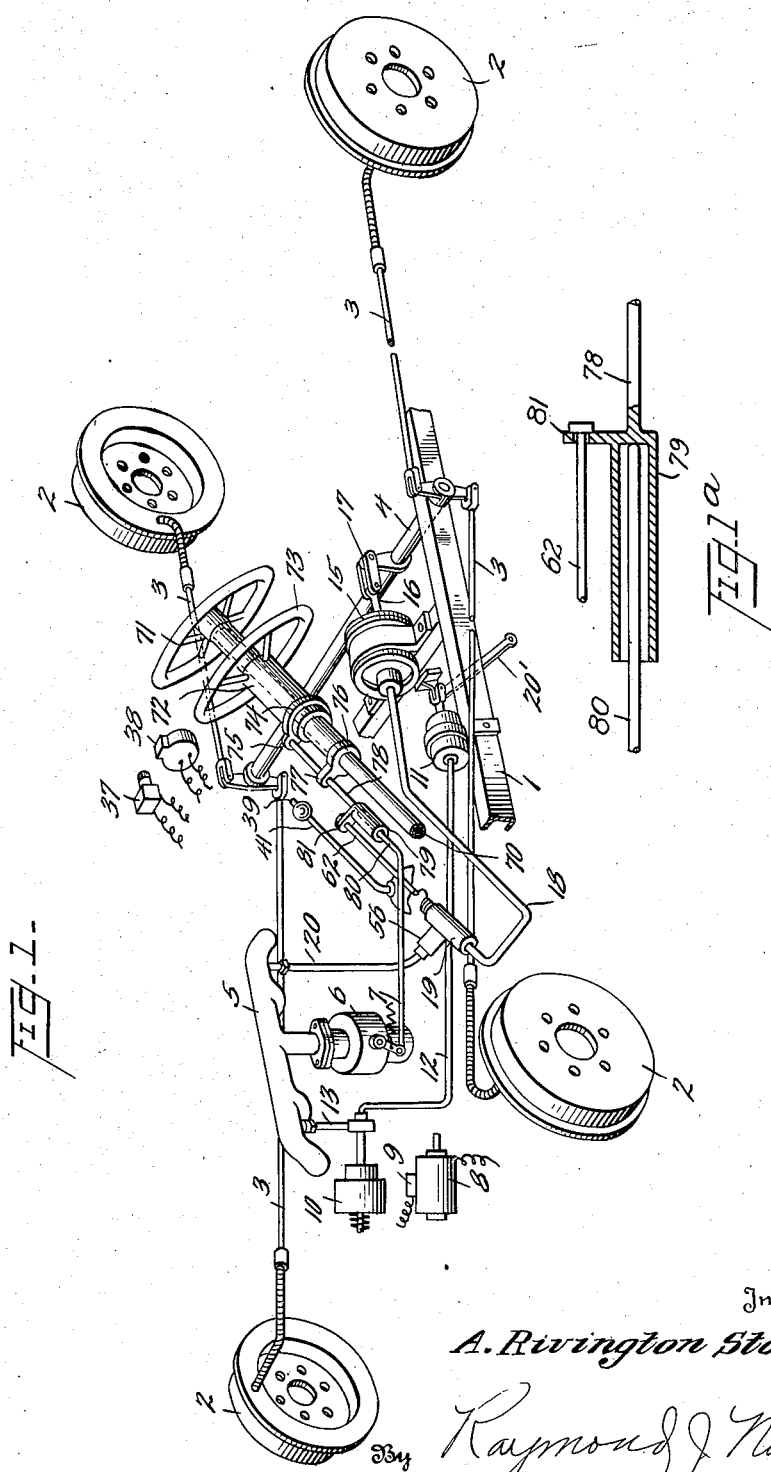
Inventor
A. Rivington Stone,
By Raymond J Norton
Attorney

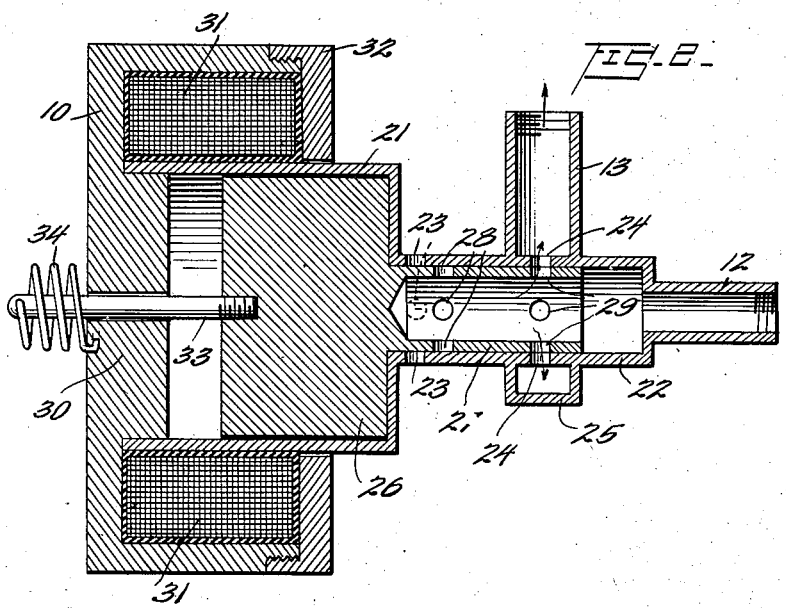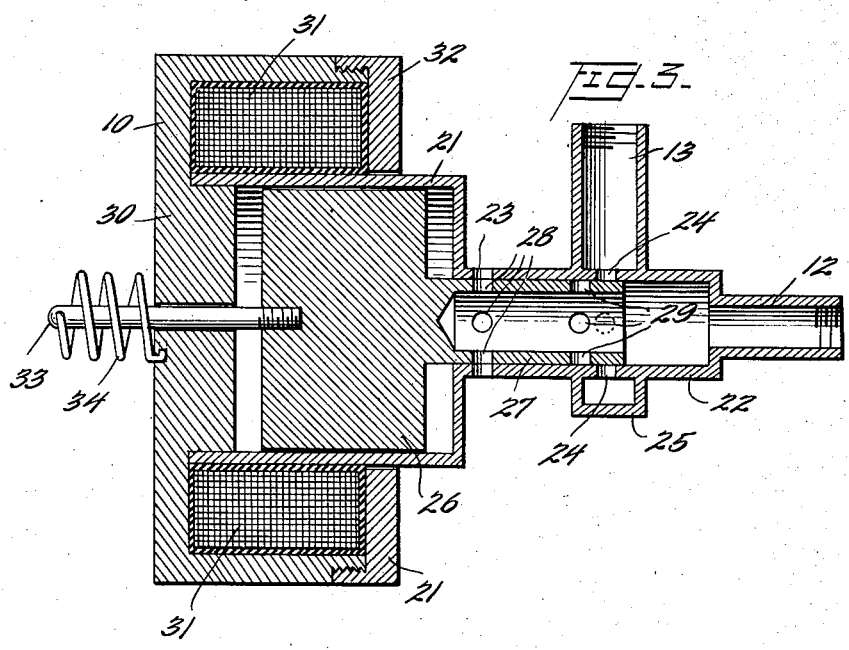

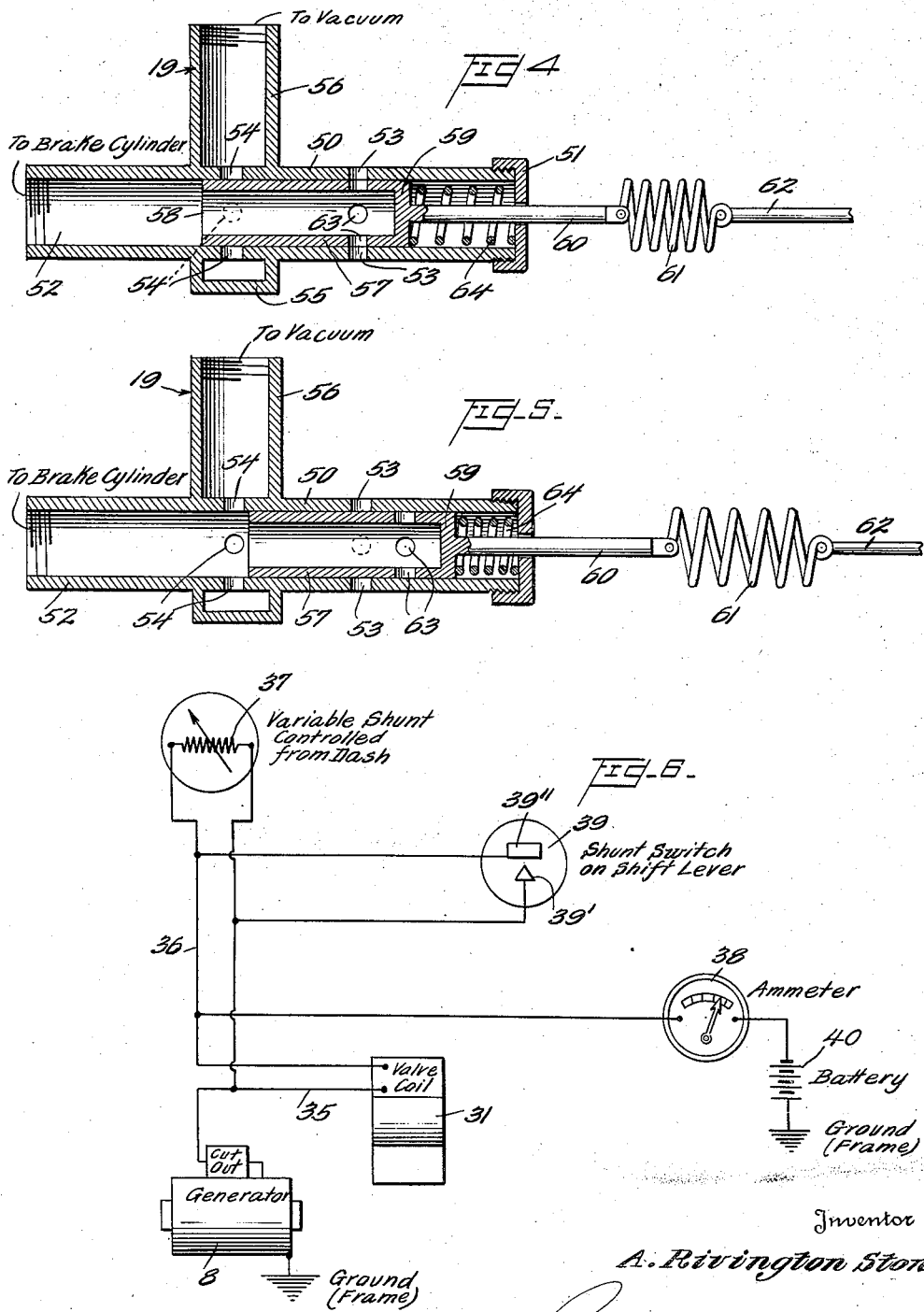

Patented Aug. 27, 1940

2,212,904

UNITED STATES PATENT OFFICE 2,212,904

POWER CLUTCH AND BRAKE ASSEMBLAGE

Albert Rivington Stone, Arlington, Va., assignor, by mesne assignments, to Carpenter-Stone, Inc., a corporation of Georgia Original application September 17, 1934, Serial No. 744,411. Divided and this application March 17, 1937, Serial No. 131,466. Renewed January 20, 1940

2 Claims. (Cl. 192—3)

This invention relates to a power clutch and brake assemblage and is a division of my prior application Serial No. 744,411, filed September 17, 1934.

It is known that certain well known automobiles are provided with power brake and/or clutch mechanism. Certain of these utilize the vacuum in the intake manifold as the actuating force. Such installations usually comprise a master cylinder connected to the clutch pedal or to the brake linkage and a pneumatic valve interposed between the cylinder and the vacuum intake manifold to open and close the fluid circuit.

A disadvantage of such structure, particularly when employed as a clutch control, is the rather sudden or immediate or non-graduated action.

I have found that when utilizing certain principles, to be hereinafter described, a power clutch or a power clutch and brake combination can be made to operate with striking smoothness.

An object of the present invention therefore is to provide an improved type of power control clutch.

Another object is to provide a novel power operated clutch and brake system.

A further object is to provide an improved type of manual control for power clutches and brakes.

Yet another object is to provide a novel type of valve for a power operated clutch.

A still further object is to provide a combined power clutch operator and valve.

With these and other equally important objects in view the invention comprehends the concept of utilizing an automatic clutch operator which is actuated by power generated in the engine and so constructed as to function with striking smoothness. The power clutch is preferably associated with a novel type of automatic brake control and the controls of the clutch and brake are so designed and correlated as to be readily operable manually from any accessible point, such as the steering point. Supplemental refinements of the invention include means for adjusting or modifying the power requirements for the operation of the clutch.

In order to more clearly explain the invention a preferred physical embodiment is shown in the accompanying drawings, in which:

Figure 1 is a skeleton view of the apparatus mounted on an automobile.

Figure 1A is an enlarged detail of the accelerator and brake operating mechanism.

Fig. 2 is an enlarged detail of the clutch operating cylinder in the inoperative position.

Fig. 3 is a corresponding view of the same structure in the operative position.

Fig. 4 is an enlarged detail of the brake control valve in the inoperative or unapplied position.

Fig. 5 is a similar view of the valve in the operative or applied condition.

Fig. 6 is a wiring diagram of the circuit employed.

As indicated hereinbefore, the major purpose of the present invention is to provide a smoothly operative automatic clutch and to associate with this a power brake. The assemblage may be so designed as to be controlled entirely from the steering wheel. As shown in the drawings, particularly in Fig. 1, the improved mechanism may be utilized on any suitable type of automobile provided with a chassis 1, a power plant (not shown), and ground wheels upon which are mounted the brake drums 2. Within the drums are mounted any suitable type of internal expanding brakes. Connected with the brakes may be the tension rods 3 which are attached to and ultimately actuated from the cross shaft 4. The cross shaft, as in the usual form of automotive construction, is mounted in suitable bearings secured to the chassis frame.

The power plant of the car includes an intake manifold 5 in fluid communication, in the usual manner, with the carbureter 6. The valve of the carbureter is actuated by means of the linkage 7. Associated with the motor is the usual type of generator 8 with which is connected the cutout 9. All of this apparatus is conventional and is described merely to illustrate the fact that the present invention is adapted to be embodied in any desired type of automobile.

In the preferred modification of the invention the clutch is operated pneumatically by reason of the vacuum in the intake manifold. Unlike prior vacuum operated clutches, however, the novel power clutch of the present invention utilizes a different principle. In the past it has been suggested to utilize the energy generated by the motor for operating the clutch or the brake. In all such proposals, however, the control mechanism involved essentially a simple two-way switch or valve. In such structures when the valve was moved to one position the energy was applied with the full power then existing in the applying circuit. Similarly when the clutch was disengaged it was as immediately or quickly withdrawn.

In the present invention on the other hand, while the pneumatic energy developed by the motor is employed as the actuating means for the clutch power cylinder, this energy is bucked or initially partially checked or modified by electrical energy developed by the motor. In a specific embodiment to be described more fully the power cylinder for the clutch comprises a solenoid-piston arrangement in which the piston is moved in one direction due to an increase in current flowing through the coils but this tendency to move is gradually retarded or resisted by a force acting in the opposite direction, which force is preferably a pneumatic force derived from the vacuum intake manifold. This solenoid piston comprises essentially a valve and when moved to one position it fully opens the vacuum circuit to allow application of the clutch. By utilizing the reverse pressure in the intake manifold to resist the movement of the solenoid a graduated and smooth clutch engagement is insured.

The power clutch mechanism is associated with a power brake mechanism, the actuating force for the latter being derived from the vacuum intake manifold and the two units are controlled by a combined controlling means mounted at some convenient position on the car where it may be under manual control and preferably upon the steering post.

As will be described more fully hereinafter, there is inserted in the electrical circuit a variable shunt whereby the power requirements for the clutch operation may be adjusted to any particular installation. Similarly, as will be described more fully hereinafter, another variable shunt is inserted in the circuit, this latter being under manual control and preferably mounted on the conventional gear shift lever whereby the solenoid may be cut out so as to immediately throw out the clutch and thus permit coasting or free-wheeling.

Within the general features above outlined it will be appreciated that a relatively large number of specifically different mechanisms may be employed. That shown in the drawings is illustrative of a preferred type which has been found to operate very effectively in practice. As shown, the clutch control mechanism may include a special clutch power control unit 10 and pneumatic cylinder 11. The unit 10 essentially comprises a valve which, when operated, submits one side of the piston or diaphragm of cylinder 11 to the then existing vacuum in the intake manifold. The units 10 and 11 are connected, as shown, by the fluid line 12, which latter has a branch line 13 attached to the intake manifold.

Similarly the brake unit comprises a power cylinder 15 which may be of any suitable type, such as is now found on the market. The piston or diaphragm of this cylinder is connected to the rod 16, one end of which is pivotally connected as through the linkage 17 to the brake cross shaft 4. The other end of the power cylinder is connected through the vacuum line 18, special valve 19 and vacuum line 20 to the intake manifold. It will be appreciated that when the valve 19 is opened by any suitable actuating means, one face of the piston or diaphragm of cylinder 15 is submitted to the vacuum in the manifold and the brakes are applied by reason of the movement of rod 16. Likewise when the clutch valve 10 is operated, in a manner to be more fully described, so as to open communication between the line 13 and cylinder 11, the piston in the latter is displaced, thus causing pivotal movement of the clutch pedal 20'. The piston of the clutch power cylinder 11 has been shown as pivotally connected to the conventional clutch pedal 20'. It will be appreciated however that if desired the clutch pedal 20' may be eliminated and the cylinder 11 directly associated with the clutch yoke. That is to say, while the present invention is described with respect to installation in a car having the brake and clutch pedals, it will be understood that it may be embodied in a car as originally built, in which case the clutch cylinder need not be directly attached to the clutch pedal but may be associated directly with the clutch, thus eliminating the need of a clutch pedal. Also it will be understood that an overrunning connection may be provided between the clutch power cylinder 11 and the clutch pedal 20' so that independent foot operation of the pedal may be employed.

As shown more particularly in Figs. 2 and 3, the clutch valve is of special construction. This comprises a shell 21 of any suitable material, such as brass. This is formed in a cup shape and is provided with the integral tubular extension 22 which, as will be seen hereinafter, serves as a valve seat. The extension has an end portion which is adapted to be connected to the fluid line 12. The tubular section 22 is likewise fitted with the tube section 13 which, as shown in Fig. 1, communicates with the intake manifold.

The tubular valve seat 22 is tapped to provide the diametrically positioned ports 23 and the ports 24. It will be observed that ports 23 are open to the atmosphere while ports 24 are adapted to communicate with the intake manifold. In order to provide for the plurality of ports 24 the valve casing 22 may be fitted with an integral or detachable collar 25 which is in open communication with the line 13.

Fitted within the shell 21 for sliding engagement therewith is a soft iron core member 26. This is provided with an integral or detachable hollow tubular extension 27. This extension projects into and is adapted to reciprocate within the valve casing 22, forming in effect a sleeve valve. The valve seat is tapped to present the ports 28 near one end and the ports 29 near the other. Ports 28 are so positioned as to register with ports 23 at one position of the valve, while ports 29 on the other end are adapted to register with ports 24 at another position of the valve.

The shell 21 is closed off at one end and is partially enclosed by the soft iron field piece. This is formed with a suitably insulated circumferential groove or channel for the reception of the coil 31. The field piece may be closed off by the detachable ring cover 32. The head of the field piece is bored to receive the brass rod 33 which is adapted to be secured, as shown, to the core. The exterior end of the rod secures one end of the tension coil spring 34. The other end of the coil spring is suitably attached to the head of the field piece.

The coil 31, as shown in Fig. 6, is connected in the electrical circuit of the motor. One terminal of the valve coil is connected through the conduit 35 to the cutout of generator 8. The other terminal is connected in circuit by means of the conductor 36 to the variable shunt 37, ammeter 38 and battery 40. Connected in parallel in this circuit is a second shunt 39 which is adapted to be manually operated and is positioned at any point accessible to the driver, such as on the shift lever.

It will be observed from an inspection of Fig. 6 that by varying the variable shunt 37 the electrical energy developed in the valve coil, for any given motor speed, may be adjusted. It will likewise be seen that when the shunt switch 39 is operated the valve coil is cut out and no current flows therein.

The operation of the clutch control valve will be appreciated from the structure described. In the position shown in Fig. 2 the clutch pedal 20 is depressed and the motor is disengaged from the driving mechanism. In this position of the parts the ports 29 and 24 register, thus putting the clutch power cylinder 11 in communication with the intake manifold, causing displacement of the piston or diaphragm of the cylinder, and thus depressing the pedal and throwing out the clutch. In this position of the parts the motor is idling and the current flowing through coils 31 is insufficient to overcome the force of the vacuum effective on the inner face of the tubular section 27.

When, however, the accelerator is depressed, the motor is speeded up and the current flowing through coil 31 commensurately increases. The increased magnetic flux then tends to move the core 26 to the left, as shown in Fig. 3. This movement of the core (and hence the valve sleeve 27) is bucked or resisted by the reverse pressure acting against the inside face of the sleeve 27 as well as by the tension of spring 34. In these circumstances, therefore, the movement of valve 27 is a graduated one. The initial movement is made against the combined force of the vacuum on the one hand and the spring on the other. When the valve 27 moves to such a position that ports 24 no longer register with ports 29, further movement of the core and valve is nevertheless resisted to a predetermined degree by the spring 34. After a given movement of the sleeve 27 the ports 28 then register with ports 23. At this moment the reverse pressure acting on the right face of the core 26 is dissipated due to the bleeding in of air through the now registered ports 23 and 28. Thus after having attained the position shown in Fig. 3 in which the clutch is engaged, such position is maintained just so long as the magnetic flux operated on the soft iron core 26 is sufficient to overcome the retractive tendency of spring 34.

It will thus be seen that in the operation of the valve, electro-magnetic force is made to operate against both a pneumatic force and a spring force acting in a direction opposite the magnetic force. The maximum retarding force obtains during the early stages of movement of the valve, and when the position of the valve parts is such as to insure engagement of the clutch, a large quantum of the reactive force is withdrawn, by reason of reducing the pressure on the right face of core 26 to atmospheric. In this way, it will be appreciated, the sudden movements of the valve are precluded and the valve, and hence the clutch, is caused to engage and disengage with a smoothly graduated action. This distinguishes sharply from prior art suggestions, as noted hereinbefore, in which engagement or disengagement of the clutch were effected by so-to-speak suddenly operative forces. The actual clutch engagement effected when employing the present mechanism is equivalent to that obtained by using a pedal control. The clutch is engaged gradually and slowly, thus precluding abrupt take-up in the clutch.

It will be appreciated of course that the current passing through the valve coil 31 depends upon the motor speed, which latter is determined by the position of the accelerator and the load on the motor.

Consonant with the objects expressed herein, means are provided to automatically cut out the valve coil during shifting of the gears. As shown in Fig. 1, the car is provided with the typical gear shift lever 41. The knob of this lever carries the shunt switch 39. This may be of any suitable construction, such as in the form of a simple plunger mechanism. This switch may comprise a fixed contact 39' and a movable contact 39'', the latter projecting above the knob and being adapted to be depressed when the operator grasps the knob for the purpose of shifting.

The function of the special gear shift lever will be readily appreciated upon reference to Fig. 6. When it is desired to shift gears, assuming the clutch is engaged, the knob 39 is grasped under such circumstances as to close the contacts 39' and 39''. In these circumstances the valve coil is shunted and no current flows therethrough. As a result the core 26 and valve sleeve 27 are moved to the position shown in Fig. 2, due to the retractive force of coil spring 34. When the valve sleeve 27 assumes a position shown in Fig. 2 it is retained there not only by reason of the action of spring 34 but also by reason of the reverse pressure or vacuum to which the interior of the sleeve is subjected. After the gear shift lever has been moved to its new speed position and released the accelerator is slightly and quickly operated. This speeds up the motor, causing a passage of current through the coils 31 of such a value as to overcome the combined forces of the spring 34 and the vacuum acting on the interior of the sleeve. In these circumstances the valve is then moved to the position shown in Fig. 3, by reason of which the vacuum is cut off and the power cylinder 11 placed under atmospheric pressure. Since the clutch pedal 20 is now relieved it is moved back, under the action of its own spring, so as to cause engagement of the clutch. This same process is repeated in passing from first to second, to third, or to the reverse speed positions. In all of these shiftings, as will be appreciated, the movement of the clutch valve is gradual due to the smooth balance set up between the spring and vacuum forces on the one hand against the electro-magnetic force on the other.

As noted hereinbefore, the major purpose of the present invention is to secure a smooth power operation of the brakes as well as the clutch. For this purpose an improved brake control valve is employed, this valve being shown in detail in Figs. 4 and 5. The brake control valve 19 may comprise a hollow tubular member 50, which is closed at one end by the apertured detachable closure 51 and is opened at the opposite end 52. The end 52 is adapted to be connected through the fluid line 18 to the brake power cylinder 15. The tubular member 50 serves as a valve casing. This is tapped at 53 to provide a plurality of ports. Similarly the tube is tapped to provide the ports 54 at a point spaced from the ports 53. The ports 54 are enclosed within a hollow collar 55, which latter communicates with the tubular extension 56. This tubular extension is adapted to be attached to the line 20, thus putting it in connection with the vacuum intake manifold.

Mounted within the valve casing 50 is the sleeve valve member 57. This is opened at one end, 58, and closed at the other end, 59. To the closed end is attached the rod 60. This extends through the aperture in the closure plate 51 and is connected at its extreme end to the coil spring 61. The other end of the coil spring is connected to the operating rod 62. The valve sleeve 57 is provided with a plurality of apertures adapted to register respectively with apertures 53. Near the closed end the sleeve is tapped to provide the ports 63. It will be seen that when the parts are in the position shown in Fig. 4, ports 53 and 63 register and port 54 is sealed by means of the sleeve 57. In these circumstances the interior of the valve, the conduit 18 and piston 15 are under atmospheric pressure and the brakes are unapplied. This is the inoperative position of the valve.

When a force is applied to link 62 the rod 60 is moved towards the right, as shown in Figure 5. In order to secure a smooth and graduated action of the brake valve and hence smooth application of the brakes, this movement is resisted by spring pressure. As shown, there is interposed between the closed end 59 of the sleeve valve and the plate 51 a compression spring 64. It is particularly to be noted that the compression spring 64 is weaker than spring 61. When it is desired to apply the brakes the operating rod 62 is moved upwardly (or to the right as shown in Fig. 4). Such movement communicated through the spring 61 to the rod 60 immediately displaces valve 57 to the right. Such immediate movement takes place due to the fact that spring 64 is relatively weak and spring 61 is relatively stronger; hence the spring 64 is immediately compressed to permit movement of the valve. The spring 61, being stiffer, is extended to a less degree. Upon such movement the port 63 no longer registers with port 53 and the end 58 of the valve moves past the ports 54, thus placing the break power cylinder 15 in communication with the intake manifold. In a short period of time, which actually is only momentary, the brake power cylinder 15 becomes exhausted, that is to say the pressure in the fluid lines 20, 56, 18 and 15 becomes equalized. As the vacuum within cylinder 15 increases it tends to overcome the force of spring 61 which heretofore has retained the valve 57 in the open position. Thus when the vacuum in the cylinder 15 reaches a predetermined amount the spring 61 is extended, that is to say the sleeve 57 tends to move to the left and this movement partially or completely closes off the vacuum ducts 56 and 18. In other words, after a predetermined movement of the rod 62 the brakes are first applied and are then held with a definite predetermined degree of force due to the automatic closing of the vacuum line. If additional brake pressure is desired the rod 62 is moved further to the right and this, in the manner described, can displace sleeve 57 to the right, submitting piston 15 to the full effect of the vacuum then obtaining in the vacuum intake manifold. In these circumstances the interior of the brake cylinder 15 will again be exhausted to a greater degree until the reverse pressure overcomes the force of the additionally extended spring 61. Due to the tendency of equalization in the vacuum line, as explained, the valve 57 again tends to move to the right thereof, automatically sealing off the vacuum line 20.

In releasing the brakes a similarly graduated releasing action is secured. If the brakes have been applied so as to exert a powerful retarding force, such force may be diminished gradually to any desired value. To do this the rod 62 is released or moved to the left a certain predetermined degree. This movement diminishes the extension in the spring 61 and since the now existing vacuum in the fluid line is sufficient to overcome this diminished retarding force in the spring, the valve becomes momentarily unbalanced or unstable and moves to the left, thus causing ports 53 and 63 to partially or wholly register. The interior of the cylinder is then placed in communication with the atmosphere and the vacuum tends to diminish. The pressure within the cylinder then reaches a new diminished value. Due to this diminished value the spring 61 tends to move the valve body to the right again, closing off the atmospheric duct 53 and thus establishing a new diminished pressure value within the cylinder. Thus the brake may be applied or released with definite gradual increments of pressure or force. It will be observed, therefore, that the unit is dynamically balanced and automatically responsive in all positions of application and release of the controlling rod or member 62. It will be understood that with such a type of dynamically balanced valve a very desirable graduated braking action is attainable.

As intimated hereinbefore, one of the major objects of the invention is to provide for the control of the power clutch and brake combination in a simple manner and entirely manual. As shown in Fig. 1, the car is provided with the usual or typical steering post 70 at one end of which is keyed the usual steering wheel 71. Mounted upon the steering post is the sleeve 72, to the upper end of which is attached a circular or segmental member 73. By using a circular member 73 it will be appreciated that this is accessible to the hands at all steering positions of the wheel 71. Preferably the parts are relatively closely juxtapositioned so that a driver may, by extending the fingers, grasp wheel 73 without relinquishing contact with wheel 71. The sleeve 72 is mounted on steering post 70 for reciprocating and rotary movement thereon. The sleeve 72 is provided with a groove in which is mounted the slip ring 74. As shown, this is formed with an apertured lug 75. Below the ring and rigidly mounted on the steering post is a collar 76 which similarly is provided with an apertured lug 77. A rod 78 is pivotally connected to the lug 75 and extends through and is guided by the lug 77. At its lower end this rod may be provided with a tubular or cup-shape member 79 in which loosely fits the accelerator rod 80. Attached to the rod 78 of tubular member 79 is a plate or lug 81 which is apertured near one end to slidingly receive the brake applying rod 72.

The operation of the novel steering and control mechanism will be appreciated from the foregoing description. When the wheel 72 is grasped and moved downwardly on the steering post, the rod 78 moves correspondingly and the tubular member 79 contacts and depresses the accelerator rod 80. During this movement the apertured lug 81 merely slides on the brake rod 62 and the brakes are unapplied. By downward or upward movement of the wheel 73 within predetermined limits, therefore, only the accelerator is operated to vary the speed of the car. When it is desired to apply the brakes the wheel 73 is moved upwardly towards the wheel 71. During the initial stages of this movement the downward pressure exerted by the tubular member 79 on the accelerator rod is relieved and the accelerator rod gradually returns to its idling position. Further upward movement of the wheel 73 will cause engagement of the enlarged end or abutment 62' of the brake rod 62 by the lug 81 and will exert pressure on the spring 61 and move the valve 57 to the right, as shown in Fig. 4, in the manner described. During such upward braking movement of the rod 62, the tubular member 79 freely slides on the accelerator rod 80 and hence does not displace the latter. It will thus be seen that the one member 73 actually subserves the double function of an accelerator pedal and a brake applying means. The operation of the entire structure will be clearly understood from the foregoing description.

In starting the car the gear shift lever is moved to the neutral position. Thereafter the engine is started and a vacuum is developed in the intake manifold. Since the motor speed is low, insufficient electro-magnetic force is developed to overcome the combined action of the spring 34 and the vacuum effective on the right face of the valve 27, and hence the clutch pedal 20 is depressed and the clutch is disengaged. The gear shift lever is then grasped and moved to first speed position. During this operation, as described, the contact terminals 39 and 39' of the shunt switch on the gear shift lever are closed and the valve coil is cut out. The wheel 73 is then depressed a sufficient distance and for a sufficient period of time to accelerate the car to the desired speed for the position of the gear shift lever. The gear shift lever is again grasped and moved to the second speed. During this movement the switch 39 is again operated, coil 31 is shunted and the valve is moved again to the position shown in Fig. 2, in which the pedal 20 is depressed by reason of the existing vacuum. When pressure on the switch 39 is released the valve coil 31 is again cut into the circuit and the valve is moved to the position shown in Fig. 3, allowing the gradual engagement of the clutch. This operation is repeated for the third speed position.

It will thus be seen that the improvements described herein insure an automatic operation of the clutch, which operation is characterized by a smoothly graduated engagement and disengagement. Similarly, the improvements assure a smoothly graduated braking action. Both the clutch and brake operations are controlled by a simple and readily accessible mechanism operative from any position of the steering wheel. The correlation between the clutch and brake is such that in a single continuous movement of the control means the clutch may automatically be disengaged and the brake automatically applied.

While a preferred embodiment of the invention has been described, it is to be understood that this is given merely to exemplify the underlying principles involved and not as delineating the limits of the invention. Various modifications and adaptations will readily suggest themselves to those skilled in the art and all such mechanical ramifications of the improvements are considered to be comprehended within the appended claims.

I claim:

1. An automotive control mechanism comprising a steering post, a steering wheel mounted on the steering post; a second wheel movable axially of the steering post; an accelerator and a brake applying member in combination, means connecting the said axially movable wheel with each the accelerator and brake applying means to sequentially operate said accelerator and brake applying means.

2. Control mechanism for the throttle and brake of a motor vehicle comprising a freely rotating hand wheel, means for limiting the movement of said wheel in an axial direction and means whereby such axial movement controls the throttle and brake.

ALBERT RIVINGTON STONE.